(12) United States Patent
Awoniyi-Oteri et al.

(10) Patent No.: US 11,711,766 B2
(45) Date of Patent: Jul. 25, 2023

(54) WAKE UP SIGNAL (WUS) DORMANCY

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/153,086

(22) Filed: Jan. 20, 2021

(65) Prior Publication Data

US 2021/0227470 A1    Jul. 22, 2021

Related U.S. Application Data

(60) Provisional application No. 62/964,077, filed on Jan. 21, 2020.

(51) Int. Cl.
| | |
|---|---|
| *H04W 52/02* | (2009.01) |
| *H04W 76/28* | (2018.01) |
| *H04W 72/1263* | (2023.01) |
| *H04W 80/02* | (2009.01) |

(52) U.S. Cl.
CPC ... *H04W 52/0235* (2013.01); *H04W 52/0229* (2013.01); *H04W 52/0274* (2013.01); *H04W 72/1263* (2013.01); *H04W 76/28* (2018.02); *H04W 80/02* (2013.01)

(58) Field of Classification Search
CPC ...................... H04W 80/02; H04W 88/08–18; H04W 92/10
See application file for complete search history.

(56) References Cited

U.S. PATENT DOCUMENTS

| | | | |
|---|---|---|---|
| 11,564,170 B2* | 1/2023 | Zhang | H04W 24/08 |
| 2012/0275366 A1* | 11/2012 | Anderson | H04W 52/0219 |
| | | | 370/311 |
| 2014/0198699 A1* | 7/2014 | Makharia | H04W 72/0413 |
| | | | 370/311 |

(Continued)

OTHER PUBLICATIONS

Ericsson: "Design of PDCCH-WUS", 3GPP TSG-RAN WG1 Meeting #99, 3GPP Draft; R1-1912780, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 18, 2019-Nov. 22, 2019, Nov. 9, 2019 (Nov. 9, 2019), pp. 1-14, XP051823592, Retrieved from the Internet URL: https://ftp.3gpp.org/tsg_ran/WG1_RL1/TSGR1_99/Docs/R1-1912780.zip, R1-1912780 Design of PDCCH-WUS.docx [retrieved on Nov. 9, 2019], section 2.2; p. 5-p. 6.

(Continued)

*Primary Examiner* — San Htun
(74) *Attorney, Agent, or Firm* — Seyfarth Shaw LLP

(57) ABSTRACT

A method of wireless communication is performed by a first device. The method includes suspending wake up signal (WUS) monitoring for a specified period of time, for a number of cycles, or until a message is received instructing resumption of monitoring. The method also includes resuming wake up signal monitoring after the specified period of time, the number of cycles, or after the message is received instructing resumption of monitoring.

11 Claims, 10 Drawing Sheets

(56) References Cited

U.S. PATENT DOCUMENTS

| | | | | |
|---|---|---|---|---|
| 2016/0270146 | A1* | 9/2016 | Feuersaenger | H04W 52/0225 |
| 2018/0255607 | A1* | 9/2018 | Nagaraja | H04W 16/28 |
| 2019/0075521 | A1* | 3/2019 | Kneckt | H04W 52/0229 |
| 2019/0110250 | A1* | 4/2019 | Huang | H04W 72/0446 |
| 2020/0037247 | A1* | 1/2020 | Liao | H04W 52/0216 |

OTHER PUBLICATIONS

Ericsson: "Wake Up Signal", 3GPP TSG-RAN2 Meeting #102, 3GPP Draft; R2-1807773, 3rd Generation Partnership Project (3GPP), Mobile Competence Centre, 650, Route Des Lucioles, F-06921 Sophia-Antipolis Cedex, France, vol. RAN WG2, No. Busan, South Korea; May 21, 2018-May 25, 2018, May 20, 2018 (May 20, 2018), pp. 1-6, XP051444116, Retrieved from the Internet URL: http://www.3gpp.org/ftp/Meetings%5F3GPP%5FSYNC/RAN2/Docs/, [retrieved on May 20, 2018], Subsection "Disabling WUS per UE or for large DRX"; p. 4; figure 1.

International Search Report and Written Opinion—PCT/US2021/014413—ISA/EPO—dated May 21, 2021.

Spreadtrum Communication: "Discussion on PDCCH-Based Power Saving Channel", 3GPP Draft, R1-1912573, 3GPP TSG RAN WG1 Meeting #99, 3rd Generation Partnership Project (3GPP), Mobile Competence Centre, 650, Route Des Lucioles, F-06921 Sophia-Antipolis Cedex, France vol. RAN WG1, No. Reno, USA, Nov. 18, 2019-Nov. 22, 2019, Nov. 8, 2019 (Nov. 8, 2019), XP051820094, 15 Pages, Retrieved from the Internet URL:https://ftp.3gpp.org/tsg_ran/WG1_RL1/TSGR1_99/Docs/R1-1912573.zip, R1-1912573_Discussion on PDCCH-Based Power.

Xiaomi Communications: "Procedures on How the PDCCH-WUS Works with C-DRX", 3GPP TSG-RAN2# 108, 3GPP Draft, R2-1914988, 3rd Generation Partnership Project (3GPP), Mobile Competence Centre, 650, Route Des-Lucioles, F-06921 Sophia-Antipolis Cedex, France, vol. RAN WG2. No. Reno, Nevada, US; Nov. 18, 2019-Nov. 22, 2019, Nov. 8, 2019 (Nov. 8, 2019), pp. 1-4, XP051816923, Retrieved from the Internet: URL: https://ftp.3gpp.org/tsg_ran/WG2_RL2/TSGR2_108/Docs/R2-1914988.zip, R2-191488 Procedures on how the PDCCH-WUS works with C-DRX.

* cited by examiner

WAKE UP SIGNAL (WUS) DORMANCY

CROSS-REFERENCE TO RELATED APPLICATION

The present application claims the benefit of U.S. Provisional Patent Application No. 62/964,077, filed Jan. 21, 2020, and titled "WAKE UP SIGNAL (WUS) DORMANCY," the disclosure of which is expressly incorporated by reference herein in its entirety.

FIELD OF THE DISCLOSURE

Aspects of the present disclosure generally relate to wireless communication, and more particularly to techniques and apparatuses for power saving signaling.

BACKGROUND

Wireless communications systems are widely deployed to provide various telecommunication services such as telephony, video, data, messaging, and broadcasts. Typical wireless communications systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a base station may be referred to as a Node B, a gNB, an access point (AP), a radio head, a transmit and receive point (TRP), a new radio (NR) BS, a fifth generation (5G) Node B, and/or the like.

The above multiple access technologies have been adopted in various telecommunication standards to provide a common protocol that enables different user equipments to communicate on a municipal, national, regional, and even global level. New Radio (NR), which may also be referred to as fifth generation (5G), is a set of enhancements to the long term evolution (LTE) mobile standard promulgated by the Third Generation Partnership Project (3GPP). New radio (NR) is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in NR and LTE technologies. Preferably, these improvements should be applicable to other multiple access technologies and the telecommunication standards that employ these technologies.

SUMMARY

A method of wireless communication is performed by a first device. The method includes suspending wake up signal (WUS) monitoring for a specified period of time, for a number of cycles, or until a message is received instructing resumption of monitoring. The method also includes resuming wake up signal monitoring after the specified period of time, the number of cycles, or after the message is received instructing resumption of monitoring.

A method of wireless communication is performed by a first device. The method includes receiving a wake up signal (WUS) indication via lower layer signaling. The method also includes performing a power saving operation based on the received WUS indication.

An apparatus includes a processor and a memory coupled with the processor. The apparatus also includes instructions stored in the memory. When the instructions are executed by the processor, the apparatus is operable to receive a wake up signal (WUS) indication via lower layer signaling. The apparatus is also operable to perform a power saving operation based on the received WUS indication.

An apparatus includes a processor and a memory coupled with the processor. The apparatus also includes instructions stored in the memory. When the instructions are executed by the processor, the apparatus is operable to receive a wake up signal (WUS) indication via lower layer signaling. The apparatus is also operable perform a power saving operation based on the received WUS indication.

The foregoing has outlined rather broadly the features and technical advantages of examples according to the present disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
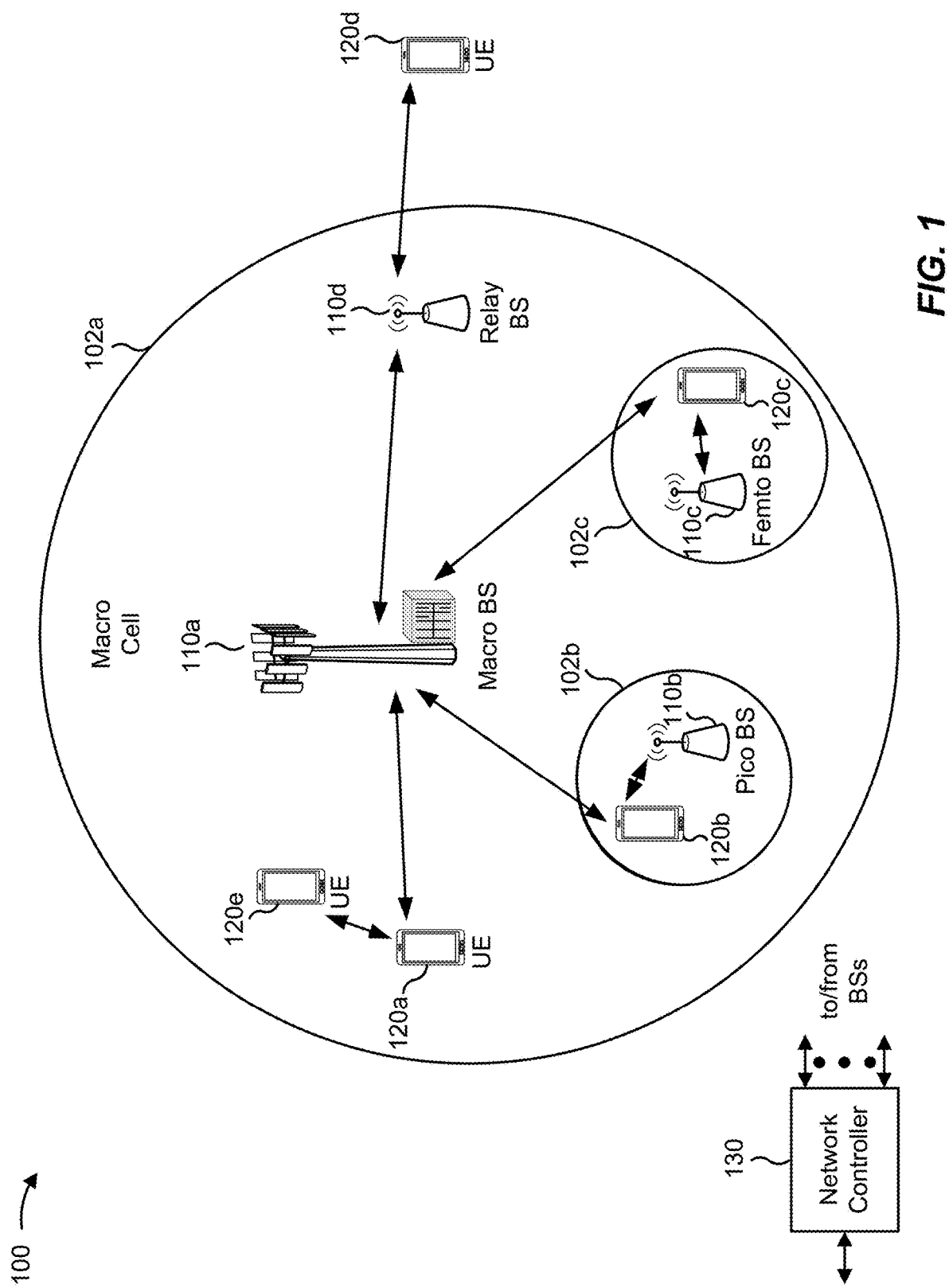
FIG. 1 is a block diagram conceptually illustrating an example of a wireless communications network, in accordance with various aspects of the present disclosure.

Various aspects of the present disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the present disclosure to those skilled in the art. Based on the teachings one skilled in the art should appreciate that the scope of the present disclosure is intended to cover any aspect of the disclosure disclosed, whether implemented independently of or combined with any other aspect of the present disclosure. For example, an apparatus may be implemented or a method may be practiced using any number of the aspects set forth. In addition, the scope of the present disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with fifth generation (5G) and later wireless technologies, aspects of the present disclosure can be applied in other generation-based communication systems, such as and including third generation (3G) and/or fourth generation (4G) technologies.

Discontinuous reception (DRX) is a power savings mode in which a user equipment (UE) may skip reception of downlink channels as a power saving technique. A DRX cycle includes an 'ON duration' period during which a UE monitors control channels, such as a physical downlink control channel (PDCCH). The DRX cycle also includes a DRX period in which monitoring of the control channels is skipped. A UE and/or a base station may use various power saving signals to improve power efficiency of the UE. For example, a wake up signal (WUS) may improve efficiency during the DRX cycle, such as a connected-mode DRX (CDRX) cycle. The UE may skip monitoring occasions (e.g., a wake up signal (WUS) occasion) or ON durations of the CDRX cycle when a wake up signal is not received, and may wake up during a next monitoring occasion or an on-duration after a WUS is received. Thus, the UE may conserve battery power by activating a low-complexity receiver, such as a WUS subsystem, until a WUS is received.

For the Third Generation Partnership Project (3GPP), Release 16, a physical downlink control channel (PDCCH)-based wake up signal (WUS) is accepted to the 3GPP new radio (NR) standard. While a PDCCH-based WUS may improve efficiency during the discontinuous reception (DRX) cycle, such as a continuous-mode DRX (CDRX) cycle, WUS power savings benefits are traffic dependent. For example, consider user equipments (UEs) with similar configurations, in which first UEs process periodic data traffic and second UEs process bursty data traffic. In this example, a significant number (e.g., 80%) of UEs with periodic data traffic (e.g., extended reality (XR), such as virtual reality and augmented reality data) experience power savings when a WUS is configured. By contrast, nearly all (e.g., 99%) of UEs with bursty data traffic (e.g., file transfer protocol (FTP) data) experience power savings with a WUS configured.

As noted above, when data traffic is bursty (e.g., file transfer protocol (FTP) data), then the wake up signal (WUS) works well; however, when data traffic is periodic (e.g., extended reality (XR) data), it may be efficient to not use the WUS. Based on these examples, monitoring for a WUS every DRX cycle might not be useful for certain applications. According to the Third Generation Partnership Project (3GPP) new radio (NR) standard, a WUS configuration is currently configured by the network at the radio resource control (RRC) layer. Currently, after a WUS configuration, the WUS may be completely activated or deactivated. An adaptive WUS configuration, either by the network (e.g., gNB) or by the user equipment (UE), is desired. Unfortunately, current WUS activation and deactivation through RRC configuration using RRC signaling incurs a significant delay (e.g., 19 milliseconds).

According to aspects of the present disclosure, a media access control (MAC) activation/deactivation indicator or a physical layer (L1) wake up signal (WUS) activation/deactivation indicator is described for dynamically changing traffic. In some aspects, a MAC control element provides for a WUS activation/deactivation, which may be referred to as a wake up signal (WUS) media access control-control element (MAC-CE). In other aspects, a physical layer L1 field is added (e.g., a single new bit (or group of bits) in the physical downlink control channel (PDCCH) for supporting a WUS activation/deactivation.

In one aspect, a signature (e.g., a bit sequence) is assigned, where a user equipment (UE) recognizes a known signature in an existing field (e.g., a control channel field) to activate or deactivate a WUS. For example, a first signature may be assigned for activation, and a second signature may be assigned for deactivation. Similarly, scrambling codes may be used where a first scrambling code is assigned to deactivation, a second code is assigned to activation, and a third code is assigned for regular use. Data bits could be used (e.g., in a physical downlink shared channel (PDSCH)), in which case an indicator is provided in the PDCCH. In these examples, base stations can also respond to a WUS using relay stations.

FIG. 1 is a diagram illustrating a network 100 in which aspects of the present disclosure may be practiced. The network 100 may be a fifth generation (5G) or new radio (NR) network or some other wireless network, such as a long term evolution (LTE) network. Wireless network 100 may include a number of base stations 110 (shown as BS 110a, BS 110b, BS 110c, and BS 110d) and other network entities. A base station (BS) is an entity that communicates with user equipments (UEs) and may also be referred to as a base station, a NR BS, a Node B (NB), a gNB, a 5G NB, an access point, a transmit and receive point (TRP), and/or the like. Each base station may provide communication coverage for a particular geographic area. In the Third Generation Partnership Project (3GPP), the term "cell" can refer to a coverage area of a base station and/or a base station subsystem serving this coverage area, depending on the context in which the term is used.

A base station (BS) may provide communication coverage for a macro cell, a pico cell, a femto cell, and/or another type of cell. A macro cell may cover a relatively large geographic area (e.g., several kilometers in radius) and may allow unrestricted access by user equipments (UEs) with a service subscription. A pico cell may cover a relatively small geographic area and may allow unrestricted access by UEs with a service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro BS. A base station for a pico cell may be referred to as a pico BS. A base station for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A base station may support one or multiple (e.g., three) cells. The terms "eNB," "base station," "NR BS," "gNB," "TRP," "AP," "node B (NB)," "5G NB," and "cell" may be used interchangeably.

In some aspects, a cell may not necessarily be stationary, and the geographic area of the cell may move according to the location of a mobile base station. In some aspects, the base stations may be interconnected to one another and/or to one or more other base stations or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a base station (BS) or a user equipment (UE)) and send a transmission of the data to a downstream station (e.g., a UE or a base station). A relay station may also be a UE that can relay transmissions for other user equipments (UEs). In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes base stations of different types, e.g., macro base stations, pico base stations, femto base stations, relay base stations, and/or the like. These different types of base stations may have different transmit power levels, different coverage areas, and different impact on interference in the wireless network 100. For example, macro base stations may have a high transmit power level (e.g., 5 to 40 Watts) whereas pico base stations, femto base stations, and relay base stations may have lower transmit power levels (e.g., 0.1 to 2 Watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

User equipments (UEs) 120 (e.g., 120a, 120b, 120c) may be dispersed throughout wireless network 100, and each user equipment (UE) may be stationary or mobile. A UE may also be referred to as an access terminal, a terminal, a mobile station, a subscriber unit, a station, and/or the like. A UE may be a cellular phone (e.g., a smartphone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system (GPS) device, or any other suitable device that is configured to communicate via a wireless or wired medium.

Some user equipments (UEs) may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet of Things (IoT) devices, and/or may be implemented as narrowband (NB)-IoT devices. Some UEs may be considered a customer premises equipment (CPE). A UE 120 may be included inside a housing that houses components of a UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different radio access technologies (RATs). In some cases, new radio (NR) or fifth generation (5G) RAT networks may be deployed.

In some aspects, two or more user equipments (UEs) 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UEs 120 may perform scheduling operations, resource selection operations, and/or other operations described elsewhere as being performed by the base station 110.

As indicated above, FIG. 1 is provided merely as an example. Other examples may differ from what is described with regard to FIG. 1.

Figure 2:
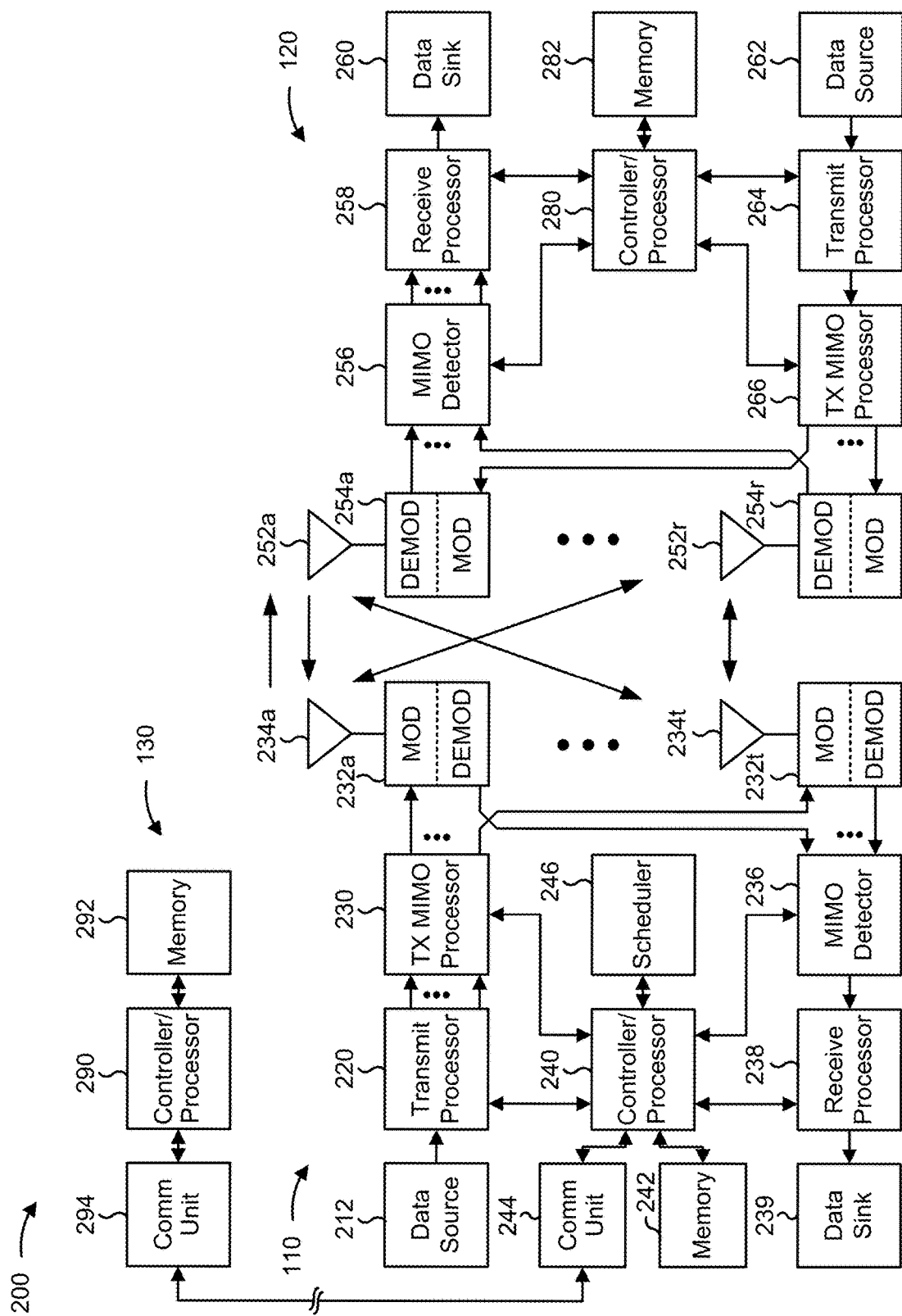
FIG. 2 is a block diagram conceptually illustrating an example of a base station in communication with a user equipment (UE) in a wireless communications network, in accordance with various aspects of the present disclosure.

FIG. 2 shows a block diagram of a design 200 of base station 110 and user equipment (UE) 120, which may be one of the base stations and one of the user equipments (UEs) in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more user equipments (UEs), select one or more modulation and coding schemes (MCS) for each user equipment (UE) based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like), and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency-division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At user equipment (UE) 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each DEMOD 254 may further process the input samples (e.g., for orthogonal frequency-division multiplexing (OFDM) and/or the like) to obtain received symbols. A multiple-input and multiple-output (MIMO) detector 256 may obtain received symbols from all R DEMODS 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at user equipment (UE) 120, a transmit processor 264 may receive and process data from a data source 262 and control information (e.g., for reports comprising reference signal received power (RSRP), received strength signal indicator (RSSI), reference signal received quality (RSRQ), channel quality indicator (CQI), and/or the like) from controller/processor 280. Transmit processor 264 may also generate reference symbols for one or more reference signals. The symbols from transmit processor 264 may be precoded by a transmit multiple-input and multiple-output (TX MIMO) processor 266 if applicable, further processed by demodulators (DEMODs) 254a through 254r (e.g., for DFT-s-OFDM, CP-OFDM, and/or the like), and transmitted to base station 110. At base station 110, the uplink signals from UE 120 and other user equipments (UEs) may be received by antennas 234, processed by demodulators 254, detected by a MIMO detector 236, if applicable, and further processed by a receive processor 238 to obtain decoded data and control information sent by the UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

A controller/processor 240 of the base station 110, a controller/processor 280 of user equipment (UE) 120, and/or any other component(s) of FIG. 2 may perform one or more techniques associated with wake up signal (WUS) activation and dormancy, as described in more detail elsewhere. For example, the controller/processor 240 of base station 110, the controller/processor 280 of the UE 120, and/or any other component(s) of FIG. 2 may perform or direct operations of, for example, a process 800 of FIG. 8, a process 900 of FIG. 9, a process 1000 of FIG. 10, and/or other processes as described. Memories 242 and 282 may store data and program codes for base station 110 and the UE 120, respectively. A scheduler 246 may schedule user equipments (UEs) for data transmission on the downlink and/or uplink.

In some aspects, the user equipment (UE) 120 may include means for receiving, means for performing, means for suspending, means for resuming, means for transmitting, and means for analyzing. Such means may include one or more components of the UE 120 or base station 110 described in connection with FIG. 2.

As indicated above, FIG. 2 is provided merely as an example. Other examples may differ from what is described with regard to FIG. 2.

As described above, a user equipment (UE) and/or a base station may use various power saving signals to improve power efficiency of the UE. For example, a wake up signal (WUS) may improve efficiency during a discontinuous reception (DRX) cycle, such as a connected-mode DRX (CDRX) cycle. The UE may skip monitoring occasions or on-durations of the CDRX cycle when a WUS is not received, and may wake up during a next monitoring occasion or an ON duration after a WUS is received. Thus, the UE may conserve battery power by activating only a low-complexity receiver, such as a wake up signal subsystem, until a wake up signal is received. Another type of power saving signal may cause the UE to skip one or more monitoring occasions (e.g., a particular number of monitoring occasions, all monitoring occasions until a WUS is received, and/or the like). This type of power saving signal may be termed a go-to-sleep signal (GTS).

In some aspects, a power saving signal (e.g., a wake up signal (WUS), a go-to-sleep signal (GTS), or another type of signal) may carry information for a user equipment (UE) that relates to power consumption, such as a value of a parameter or a status relating to power consumption. For example, the parameters may indicate a group of active carriers (e.g., carrier aggregation), a bandwidth (e.g., a bandwidth part (BWP) configuration), a connected-mode discontinuous reception (CDRX) configuration (e.g., an ON duration length, CDRX cycle length, inactivity timer, and/or the like), a control channel configuration (e.g., a physical downlink control channel (PDCCH) monitoring periodicity, a control resource set (CORESET) bandwidth, and/or the like), as well as other information.

In some cases, different types of devices supporting different types of applications and/or services may coexist in a cell. Examples of different types of devices include user equipment (UE) handsets, customer premises equipments (CPEs), vehicles, Internet of Things (IoT) devices, and/or the like. Examples of different types of applications include ultra-reliable low-latency communication (URLLC) applications, massive machine-type communication (mMTC) applications, enhanced mobile broadband (eMBB) applications, vehicle-to-everything (V2X) applications, and/or the like. Furthermore, in some cases, a single device may support different applications or services simultaneously.

Power saving signals may need to satisfy different constraints for different device types, applications, and/or services. For example, a power saving signal may need to satisfy a reliability constraint (e.g., with regard to a false alarm and/or misdetection probability) or a coverage, latency, and/or detection complexity (e.g., relating to a user equipment (UE) capability). As a more particular example, ultra-reliable low-latency communication (URLLC) may specify a low misdetection probability and a low detection latency for a power saving signal, whereas massive machine-type communication (mMTC) may require a low detection energy for a power saving signal. Due to these different (and sometimes contradictory) constraints, a single type or a single configuration of the power saving signal may not satisfy all constraints for all UE types, applications, or services. Furthermore, designing the power saving signal based at least in part on a most stringent constraint of these constraints may cause significant overhead and may not perform optimally in many situations.

Some techniques and apparatuses described may provide for a power saving signal configuration to be selected from a set of power saving signal configurations. For example, a power saving signal configuration may identify parameters or configuration values to transmit or receive a power saving signal. A user equipment (UE) may be configured with a set of power saving signal configurations corresponding to power saving signals to be used in different situations (e.g., by different types of user equipments (UEs), for different services, for different applications, and/or the like). The UE and/or the base station may determine a selected power saving signal configuration from the set of power saving signal configurations, and may transmit or receive a power saving signal in accordance with the selected power saving signal configuration. In this way, power saving signals may be provided in conformance with constraints of different UE types, applications, and/or services, thus improving network performance and UE power efficiency.

Figure 3:
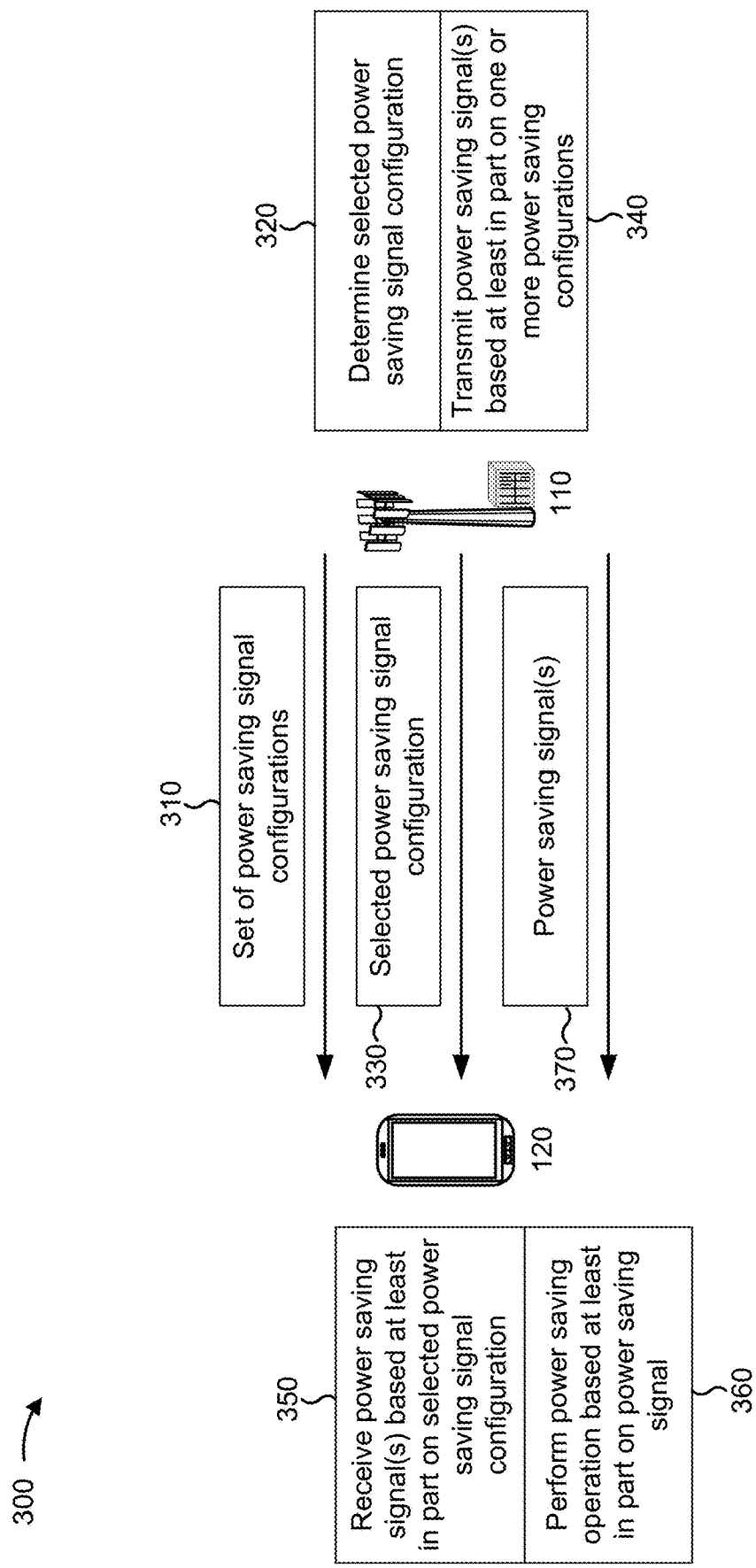
FIG. 3 is a diagram illustrating an example of base station-side determination of a selected power saving signal configuration for a power saving signal, in accordance with various aspects of the present disclosure.

FIG. 3 is a diagram illustrating an example 300 of base station-side determination of a selected power saving signal configuration for a power saving signal, in accordance with various aspects of the present disclosure.

As shown in FIG. 3, and by reference number 310, in some aspects, a base station 110 may provide information identifying a set of power saving signal configurations to a user equipment (UE) 120. The set of power saving signal configurations may identify power saving signal configurations to be selected for transmission or reception of a power saving signal based at least in part on one or more criteria. In some aspects, a power saving signal may correspond to a particular UE, a particular group of user equipments (UEs), a particular UE type, a particular service, a particular group of services, a particular application, a particular group of applications, and/or the like. As just one example, the set of power saving signal configurations may identify a first power saving signal configuration to be used by a UE when the UE is to perform enhanced Mobile Broadband (eMBB) communication and a second power saving signal configuration to be used by the UE when the UE is to perform ultra-reliable low-latency communication (URLLC) communication.

In some aspects, the user equipment (UE) 120 may store the information identifying the set of power saving signal configurations. For example, the UE 120 may store the information identifying the set of power saving signal configurations based at least in part on receiving the information identifying the set of power saving signal configurations from the base station 110, or may store the information identifying the set of power saving signal configurations independently from the base station 110 (e.g., based at least in part on a wireless communications standard or specification, a manufacturer configuration, and/or the like).

In some aspects, a power saving signal configuration may identify a type of power saving signal (e.g., a control channel-based power saving signal such as a physical downlink control channel (PDCCH)-based power saving signal, a reference signal (RS)-based power saving signal, a sequence-based power saving signal, and/or the like). In some aspects, a power saving signal configuration may identify configuration information for a particular type of power saving signal. For example, when the power saving signal is a PDCCH-based power saving signal, the power saving signal configuration may identify a channel coding scheme (e.g., repetition-based, simplex, Reed-Muller, Polar, convolutional coding, and/or the like), whether a cyclic redundancy check (CRC) is to be used (e.g., to provide a lower false-alarm probability), a control channel element (CCE) aggregation level, a number of symbols of the power saving signal, and/or the like. As another example, when the power saving signal is an RS-based power saving signal or a sequence-based power saving signal, the power saving signal configuration may identify a bandwidth, a resource element (RE) density, a number of repetitions, a beam-sweeping configuration (e.g., a number of beams, a direction of beams, a quasi-collocation relationship for the power saving signal, and/or the like).

As shown by reference number 320, the base station 110 may determine a selected power saving signal configuration. In some aspects, the user equipment (UE) 120 may determine a selected power saving signal configuration, as described in more detail in connection with FIG. 4, below. In some aspects, the base station 110 may determine a selected power saving signal configuration for a particular time period (e.g., a slot, a subframe, a connected-mode discontinuous reception (CDRX) cycle, and/or the like), a particular frequency (e.g., a bandwidth part, a carrier, a band), a particular spatial resource (e.g., a beam, a direction, and/or the like), and/or the like. In some aspects, the base station 110 may determine a selected power saving signal configuration for a group of user equipments (UEs), for all UEs covered by the base station 110, and/or the like. In some aspects, the base station 110 may determine a selected power saving signal configuration for a single UE. For example, the base station 110 may determine respective power saving signal configurations for one or more UEs covered by the base station 110.

In some aspects, the base station 110 may determine the selected power saving signal configuration based at least in part on a channel condition. In some aspects, the base station 110 may determine the selected power saving signal configuration based at least in part on a user equipment (UE) mobility state. For example, the base station 110 may determine that a cell-edge UE 120 or a high-mobility UE 120 is to use an reference signal (RS)-based power saving signal for improved coverage or that a cell-center UE 120 or a low-mobility UE 120 is to use a physical downlink control channel (PDCCH)-based power saving signal for improved power management information provision. In some aspects, the base station 110 may determine the selected power saving signal configuration based at least in part on a measurement report from the UE 120. For example, the UE 120 may provide the measurement report to the base station 110 (not shown in FIG. 3).

In some aspects, the base station 110 may determine a power saving signal configuration based at least in part on a request for the power saving signal configuration. For example, the user equipment (UE) 120 may determine a desired power saving signal configuration (e.g., based at least in part on the criteria described above or other criteria), and may provide a request to the base station 110 indicating the desired power saving signal configuration (not shown in FIG. 3). This may conserve processor resources of the base station 110 that would otherwise be used to determine the selected power saving signal configuration at the base station 110.

As shown by reference number 330, the base station 110 may provide information indicating the selected power saving signal configuration to the user equipment (UE) 120. In some aspects, the base station 110 may provide this information as downlink control information, radio resource control information, a media access control (MAC) control element (CE) and/or the like. In this way, the base station 110 may indicate, to the UE 120, the selected power saving signal configuration, thereby conserving processor resources of the UE 120 that would otherwise be used to determine the selected power saving signal configuration at the UE 120. In some aspects, the base station 110 may provide information identifying respective power saving signal configurations to multiple user equipments (UEs) 120. In some aspects, the base station 110 may not signal the selected power saving signal configuration to the UE 120, thereby conserving signaling resources of the base station 110. In this case, the UE 120 may determine the selected power saving signal configuration independently of the base station 110 (e.g., based at least in part on the set of power saving signal configurations), or may perform blind decoding using hypotheses based at least in part on the set of power saving signal configurations, as described in more detail below.

As shown by reference number 340, the base station 110 may transmit one or more power saving signals (shown as "power saving signal(s)") based at least in part on one or more power saving signal configurations. For example, in the case when the base station 110 signals the selected power saving signal configuration, the base station 110 may transmit the one or more power saving signals based at least in part on the selected power saving signal configuration. In some aspects, the base station 110 may transmit the one or more power saving signals according to multiple, different selected power saving signal configurations (e.g., when the one or more power saving signals include multiple power saving signals to be received by user equipments (UEs) 120 associated with different selected power saving signal configurations).

As an illustrative example, assume that a first user equipment (UE) 120 is at a cell edge and a second UE 120 is at a cell center of a cell provided by the base station 110. In that case, the base station 110 may select a first power saving signal configuration, of a set of power saving signal configurations, for the first UE 120, and may select a second power saving signal configuration, of the set of power saving signal configurations, for the second UE 120. The first power saving signal configuration may indicate that a reference signal (RS)-based power saving signal is to be transmitted for the first UE 120, and may indicate a bandwidth, a number of repetitions, and/or the like, for the RS-based power saving signal. The second power saving signal configuration may indicate that a physical downlink control channel (PDCCH)-based power saving signal is to be transmitted for the second UE 120, and may indicate a channel coding scheme, a presence of a cyclic redundancy check (CRC), and/or the like for the PDCCH-based power saving signal. The base station 110 may generate and transmit the RS-based power saving signal in accordance with the first power saving signal configuration and the PDCCH-based power saving signal in accordance with the second power saving signal configuration. Thus, the base station 110 efficiently provides wake up signals for the first UE 120 and the second UE 120, despite the differing channel conditions and requirements of the first UE 120 and the second UE 120. Thus, network efficiency and power management of the base station 110, the first UE 120, and the second UE 120 are improved.

In some aspects, a power saving signal may include a wake up signal. In some aspects, a power saving signal may include a go-to-sleep signal. In some aspects, a power saving signal may include information for performing power management (e.g., information for a user equipment (UE) 120 to trigger a parameter change or a status change related to power consumption). For example, the parameter change may relate to a group of active carriers (e.g., for carrier aggregation), a bandwidth (e.g., a bandwidth Part (BWP) configuration), a connected-mode discontinuous reception (CDRX) configuration (e.g., an ON duration length, a CDRX cycle length, an inactivity timer, and/or the like), a control channel configuration (e.g., a physical downlink control channel (PDCCH) monitoring periodicity, a control resource set (CORESET) bandwidth, and/or the like), and/or the like.

In some aspects, a reference signal (RS)-based wake up signal may be based at least in part on a channel state information reference signal, a tracking reference signal, a demodulation reference signal, or a different type of reference signal. In some aspects, a sequence-based wake up signal may be based at least in part on a preamble, a physical control format indicator channel (PCFICH), and/or the like. In some aspects, a physical downlink control channel (PDCCH)-based wake up signal may be based at least in part on a downlink control information format.

As shown by reference number 350, the user equipment (UE) 120 may receive the one or more power saving signals based at least in part on the selected power saving signal configuration. For example, the UE 120 may monitor a particular bandwidth or sub-band, may monitor particular time, spatial, or frequency resources, may search particular search spaces, may perform decoding based at least in part on an indicated channel coding scheme, may perform a cyclic redundancy check (CRC) in a particular fashion, may decode a particular number of repetitions, and/or the like, based at least in part on the selected power saving signal configuration.

In some aspects, the user equipment (UE) 120 may perform blind decoding based at least in part on multiple, different hypotheses. For example, the base station 110 may determine the selected power saving signal configuration, and may not indicate the selected power saving signal configuration to the UE 120. In such a case, the UE 120 may search based at least in part on hypotheses until a power saving signal is detected. The hypotheses may be based at least in part on the set of power saving signal configurations, a subset of the set of power saving signal configurations, and/or the like. In some aspects, the base station 110 may provide information indicating selected power saving signal configurations for all power saving signals to be transmitted by the base station 110. User equipments (UEs) 120 covered by the base station 110 may perform blind searches based at least in part on the selected power saving signal configurations until each UE 120 identifies a power saving signal relevant to that UE 120 (e.g., based at least in part on encoding the power saving signal using a value specific to that UE 120). This may reduce overhead relative to signaling each selected power saving signal configuration to the corresponding UE 120.

As shown by reference number 360, the user equipment (UE) 120 may perform a power saving operation based at least in part on the power saving signal received from the base station 110 shown by reference number 370. For example, when the power saving signal is a wake up signal, the UE 120 may wake up in a next ON duration. As another example, when the power saving signal is a go-to-sleep signal, the UE 120 may skip one or more ON durations based at least in part on the go-to-sleep signal. As yet another example, the UE 120 may adjust a parameter relating to power management, such as a transmit power, a bandwidth, a number of active component carriers, a connected-mode discontinuous reception (CDRX) cycle configuration, and/or the like. In some aspects, when the power saving signal pertains to a particular application or group of applications, the UE 120 may perform the power saving operation for the particular application or group of applications. In some aspects, when the power saving signal pertains to a particular service or group of services, the UE 120 may perform the power saving operation for the particular service or group of services.

In this way, power saving signals may be configured to meet the constraints or specifications of different user equipments (UEs) and to take into account different channel conditions for different UEs. For example, each power saving signal configuration, of the set of power saving signal configurations, can be configured on a per application, a per service, and/or a per user equipment (UE) basis. Configuring a power saving signal configuration on a per application basis may refer to a first power saving signal configuration being configured for a first application, a second power saving signal being configured for a second application, and so on. Per UE and per service bases are defined similarly. Thus, the reliability of power saving signals may be improved and UE power management may be more reliably administered, thereby improving UE power efficiency.

As indicated above, FIG. 3 is provided as an example. Other examples may differ from what is described with respect to FIG. 3.

Figure 4:
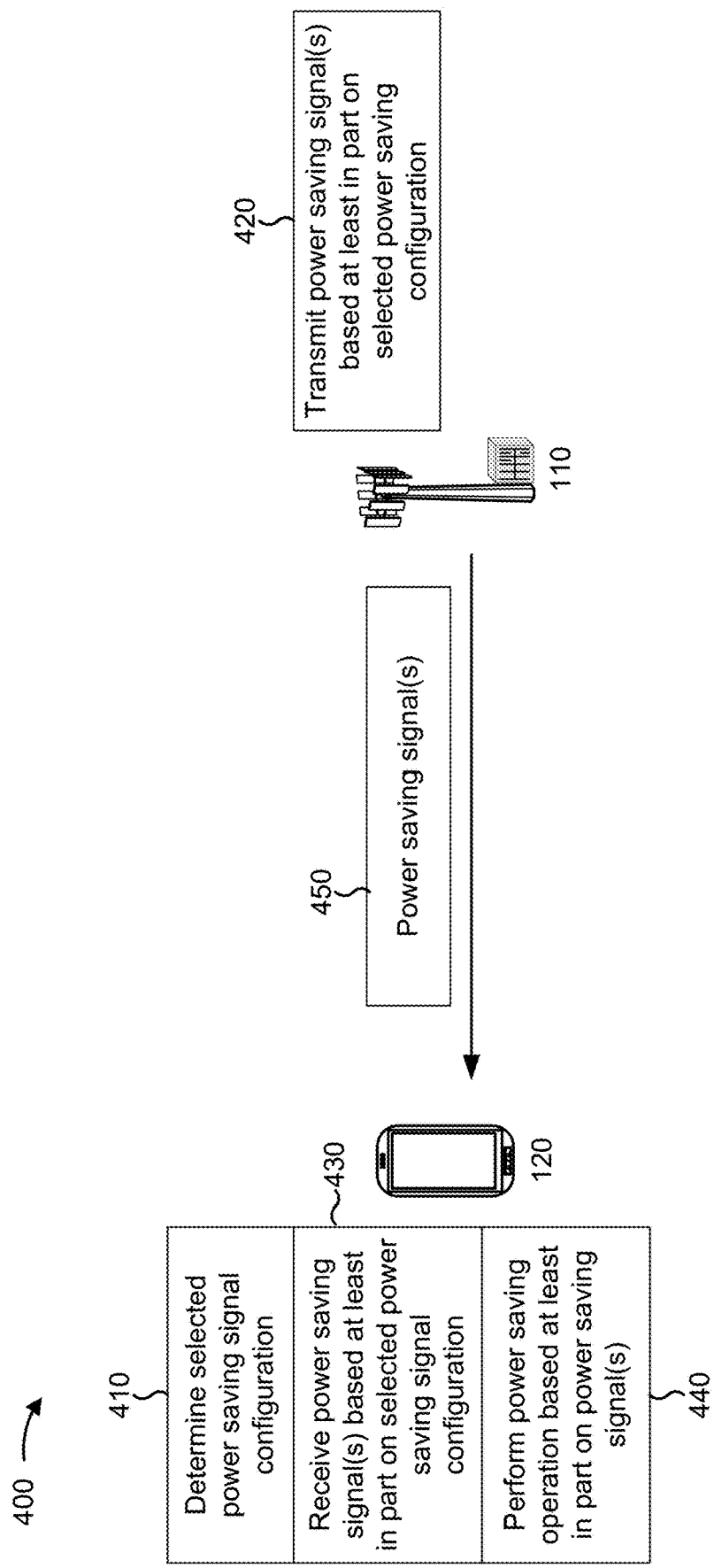
FIG. 4 is a diagram illustrating an example of user equipment (UE)-side determination of a selected power saving signal configuration for a power saving signal, in accordance with various aspects of the present disclosure.

FIG. 4 is a diagram illustrating an example 400 of user equipment (UE)-side determination of a selected power saving signal configuration for a power saving signal, in accordance with various aspects of the present disclosure.

As shown in FIG. 4, and by reference number 410, in some aspects, a user equipment (UE) 120 may determine a selected power saving signal configuration. For example, the UE 120 may determine the selected power saving signal configuration based at least in part on a channel condition at the UE 120, a mobility state of the UE 120, a measurement performed by the UE 120, an application associated with the UE 120, a service used for communication by the UE 120, a previous power saving signal (e.g., a failure to receive a previous power saving signal, a successful reception of a previous power saving signal, and/or the like), and/or the like.

As shown by reference number 420, a base station 110 may transmit one or more power saving signals based at least in part on the selected power saving signal configuration. For example, in some cases, the user equipment (UE) 120 may signal a request for the selected power saving signal configuration to the base station 110. In this case, the base station 110 may transmit a power saving signal, shown as reference number 450, based at least in part on the selected power saving signal configuration, thereby conserving processor resources of the base station 110 that would otherwise be used to determine the selected power saving signal configuration and signaling resources of the base station 110 and that would otherwise be used to transmit multiple, different power saving signals for the UE 120. In some aspects, the base station 110 may transmit multiple, different power saving signals based at least in part on the set of power saving signal configurations that is known to the UE 120 and the base station 110. In this case, the UE 120 may receive a power saving signal, of the multiple, different power saving signals, based at least in part on the selected power saving signal configuration. Thus, signaling resources of the UE 120 that would otherwise be used to indicate the selected power saving signal configuration to the base station 110 are conserved.

As shown by reference number 430, the user equipment (UE) 120 may receive the one or more power saving signals based at least in part on the selected power saving signal configuration. This is described in more detail above in connection with FIG. 3. As shown by reference number 440, the UE 120 may perform a power saving operation based at least in part on the one or more power saving signals. This is also described in more detail above in connection with FIG. 3.

In this way, the user equipment (UE) 120 may determine the selected power saving signal configuration, and may receive the power saving signal based at least in part on the selected power saving signal configuration. Thus, resources of the base station 110 that would otherwise be used to determine the selected power saving signal configuration for the UE 120 are conserved.

As indicated above, FIG. 4 is provided as an example. Other examples may differ from what is described with respect to FIG. 4.

Figure 5:
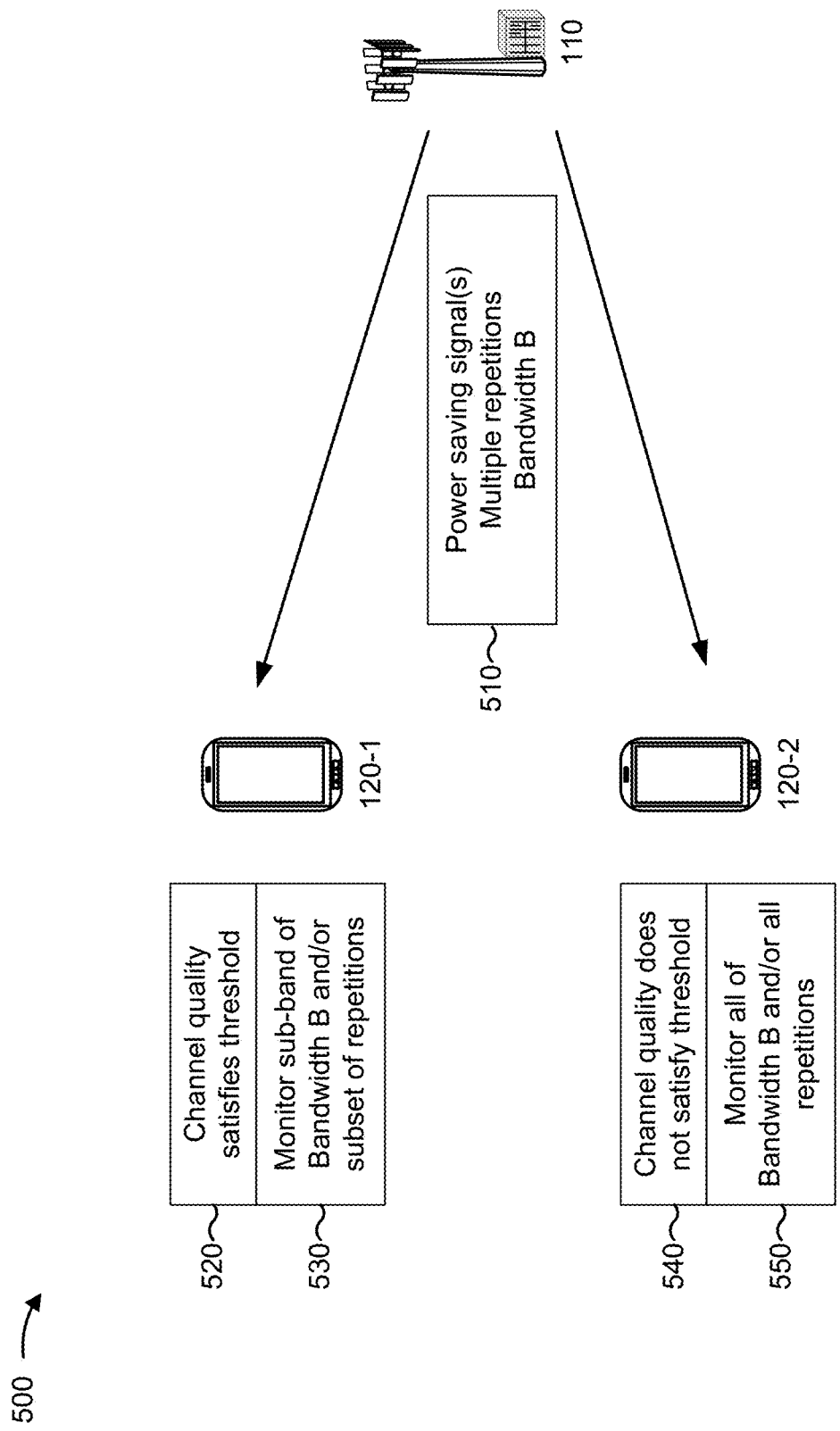
FIG. 5 is a diagram illustrating an example of user equipment (UE)-side scaling of a power saving signal configuration based at least in part on channel conditions, in accordance with various aspects of the present disclosure.

FIG. 5 is a diagram illustrating an example 500 of user equipment (UE)-side scaling of a power saving signal configuration based at least in part on channel conditions, in accordance with various aspects of the present disclosure. As shown, FIG. 5 includes a UE 120-1 and a UE 120-2. In some aspects, the UE 120-1 and the UE 120-2 may be associated with a UE group or may be part of a same UE group. In some aspects, the UE 120-1 and the UE 120-2 may not be associated with a UE group (e.g., may not be part of the same UE group).

As shown by reference number 510, the base station 110 may transmit one or more power saving signals for the user equipment (UEs) 120-1 and 120-2. As further shown, the base station 110 may perform multiple repetitions of the one or more power saving signals, and may transmit the one or more power saving signals with a Bandwidth B. In this case, the UEs 120-1 and 120-2 may use a common power saving signal (e.g., a power saving signal using group-specific signaling, when the UEs 120-1 and 120-2 are associated with a same UE group). Thus, the base station 110 may configure the power saving signal to meet a most stringent requirement of the UEs 120-1 and 120-2. For example, the base station 110 may configure the power saving signal to meet a most stringent reliability requirement, a most stringent latency requirement, a most stringent transmission energy requirement, and/or the like.

As shown by reference number 520, the user equipment (UE) 120-1 may determine that a channel quality of the UE 120-1 satisfies a threshold. For example, the UE 120-1 may determine that the channel quality satisfies a quality threshold, indicating the channel quality is good. Accordingly, and as shown by reference number 530, the UE 120-1 may monitor a sub-band of Bandwidth B and/or a subset (e.g., a proper subset) of repetitions of the one or more power saving signals. Thus, the UE 120-1 may conserve monitoring resources that would otherwise be used to monitor the entirety of Bandwidth B and/or all repetitions of the power saving signal.

As shown by reference number 540, the user equipment (UE) 120-2 may determine that a channel quality of the UE 120-2 fails to satisfy a threshold. For example, the UE 120-2 may determine that the channel quality does not satisfy the quality threshold, indicating that the channel quality is bad. Accordingly, and as shown by reference number 550, the UE 120-2 may monitor all of Bandwidth B (e.g., an entirety of the bandwidth of the one or more power saving signals) and/or all repetitions of the one or more power saving signals. Thus, the UE 120-2 may improve a likelihood of reception of the power saving signal.

In this way, the user equipment (UE) 120-1 and the UE 120-2 may perform UE-side scaling of the power saving signal. For example, each UE 120-1, 120-2 of the UE group may determine a respective monitoring configuration based at least in part on conditions at that UE, thereby reducing the number of different power saving signal configurations to be used by the base station, which conserves resources of the base station.

The operations described in connection with FIG. 5 are primarily described with reference to channel quality. However, the operations described in connection with FIG. 5 can be performed using other factors. As one example, the factor may relate to a reliability requirement (e.g., a user equipment (UE) or application that specifies a higher reliability level may monitor more repetitions or a wider bandwidth than a UE or application that does not specify a higher reliability). As another example, the factor may relate to a UE capability. For example, if a UE has a larger number of antennas, the UE may monitor fewer repetitions than a UE with a smaller number of antennas due to the receive diversity of the UE with the larger number of antennas.

As indicated above, FIG. 5 is provided as an example. Other examples may differ from what is described with respect to FIG. 5.

For the Third Generation Partnership Project (3GPP), Release 16, a physical downlink control channel (PDCCH)-based wake up signal (WUS) is included in the 3GPP new radio (NR) standard. While a PDCCH-based WUS may be used for improved efficiency during a discontinuous reception (DRX) cycle, such as a connected-mode DRX (CDRX) cycle, WUS power savings benefits are traffic dependent. For example, assuming user equipments (UEs) with similar configurations, in which first UEs process periodic data traffic and second UEs process bursty data traffic. In this example, a significant number (e.g., 80%) of UEs with periodic data traffic (e.g., extended reality (XR), such as virtual reality and augmented reality data) experience power savings when a WUS is configured. By contrast, nearly all (e.g., 99%) of UEs with bursty data traffic (e.g., file transfer protocol (FTP) data) experience power savings with a WUS configured.

According to the Third Generation Partnership Project (3GPP) new radio (NR) standard, a wake up signal (WUS) configuration is currently configured by the network at the radio resource control (RRC) layer. In addition, after a WUS configuration, a WUS may be completely activated or deactivated. A traffic dependent, adaptive WUS configuration, either by the network (e.g., a base station) or by the user equipment (UE), is desired. Unfortunately, a WUS activation/deactivation is currently performed through an RRC configuration using RRC signaling, which exhibits a significant delay (e.g., 19 milliseconds).

According to aspects of the present disclosure, a media access control (MAC) activation/deactivation indicator or a physical layer (L1) wake up signal (WUS) activation/deactivation indicator is described for dynamically changing traffic. In some aspects, a MAC control element is provided for a WUS activation/deactivation. In other aspects, a physical layer L1 field is added (e.g., a single new bit (or group of bits) in the physical downlink control channel (PDCCH) for supporting a WUS activation/deactivation. In this example, the wake up signal indication is composed of an activation signal or a deactivation signal from the physical layer (L1).

In one configuration, a signature (e.g., a bit sequence) is assigned, where a user equipment (UE) would recognize the signature in an existing field to activate or deactivate a WUS. For example, a first signature may be assigned for activation, and a second signature may be assigned for deactivation. Similarly, scrambling codes may be used where a first scrambling code may be assigned to deactivation, a second code may be assigned to activation, and a third code may be assigned for regular use. Data bits could be used (e.g., in a physical downlink shared channel (PDSCH)), in which case an indicator is provided in the PDCCH. In these examples, base stations can also respond to wake up signaling using relay stations.

Figure 6A:
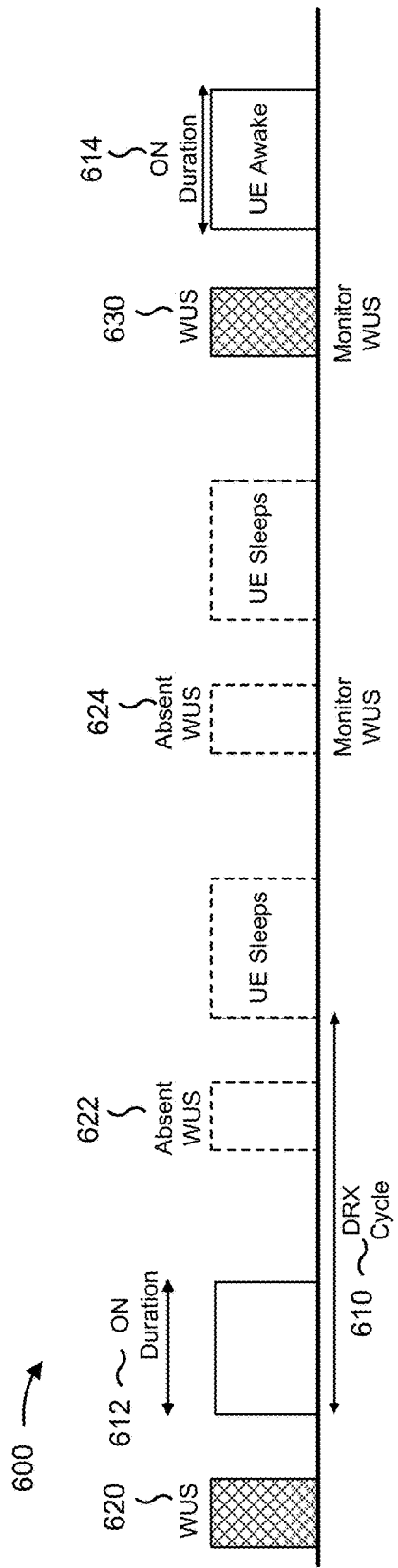
FIGS. 6A and 6B are diagrams illustrating an example of a user equipment (UE)-side wake up signal (WUS) activation/deactivation configuration for power savings, in accordance with various aspects of the present disclosure.
Figure 6B:
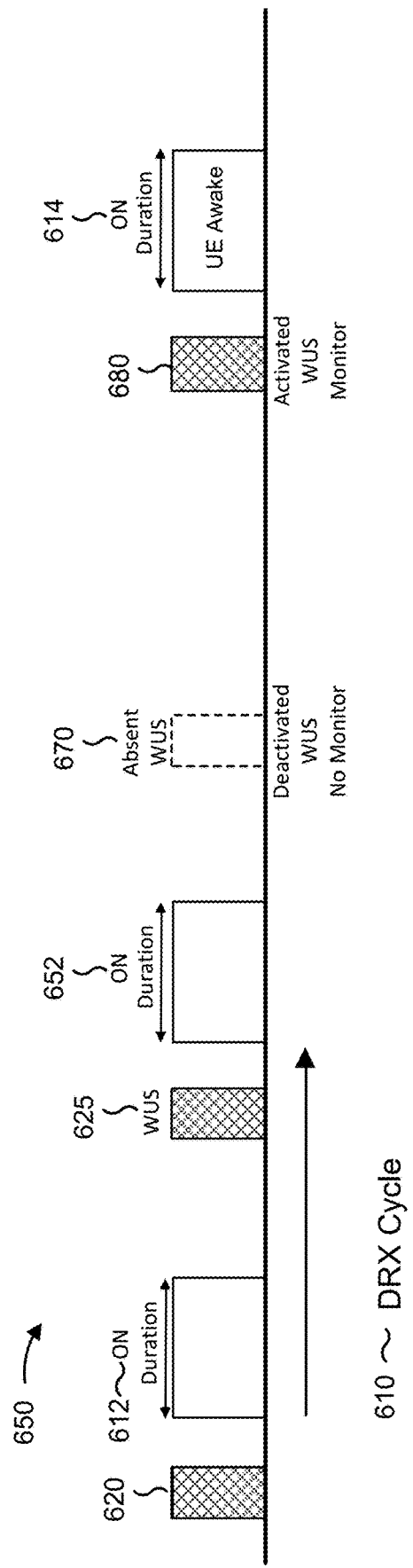

FIGS. 6A and 6B are diagrams illustrating examples of a user equipment (UE)-side wake up signal (WUS) activation/deactivation configuration for power savings, in accordance with various aspects of the present disclosure. As described, discontinuous reception (DRX) is a power savings mode in which a UE may skip reception of downlink channels to conserve power. As shown in a diagram 600 of FIG. 6A, a DRX cycle 610 includes an ON duration 612 during which a UE monitors control channels, such as a physical downlink control channel (PDCCH). The DRX cycle 610 may also include a DRX period during the remainder of the DRX cycle 610 in which monitoring of the control channels is skipped.

According to aspects of the present disclosure, a user equipment (UE) and/or a base station may use various power saving signals to improve power efficiency of the UE. For example, a wake up signal (WUS) 620 may improve efficiency during the discontinuous reception (DRX) cycle 610, such as a connected-mode DRX (CDRX) cycle. The UE may skip monitoring occasions or ON durations of a CDRX cycle when the WUS 620 is not received (e.g., an absent WUS 622). In this example, the UE sleeps after detecting the absent WUS 622 and may wake up during a next monitoring occasion or an ON duration 614 after a WUS 630 is received. Thus, the UE may conserve battery power by activating a low-complexity receiver, such as a wake up signal subsystem, until a wake up signal (e.g., WUS 620/630) is received.

As seen FIG. 6A, the WUS 620 is sent by a base station (e.g., gNB) to the user equipment (UE) during a connected-mode discontinuous reception (CDRX) cycle, before or at the beginning of the DRX ON duration 612. The WUS 620 is a signal that is used by the base station for communicating to the UE whether to wake up during a next DRX ON duration (e.g., 612) to prepare for data reception. In this example, because a WUS is not received by the UE (e.g., an absent WUS 622 and an absent WUS 624), the UE stays asleep until a next WUS occasion (e.g., WUS 630), which spans multiple DRX cycles.

As noted above, when data traffic is bursty (e.g., file transfer protocol (FTP) data), then wake up signaling works well; however, when data traffic is periodic (e.g., extended reality (XR) such as virtual reality and augmented reality data), it may be efficient to not use wake up signaling. Based on these examples, monitoring for a wake up signal (WUS) every discontinuous reception (DRX) cycle 610 might not be useful for certain applications. According to aspects of the present disclosure, a media access control (MAC) activation/deactivation indicator or a physical layer (L1) WUS activation/deactivation indicator is described for dynamically changing traffic.

FIG. 6B is a diagram 650 illustrating an example of a user equipment (UE)-side wake up signal (WUS) activation/deactivation configuration for power savings, in accordance with various aspects of the present disclosure. In some aspects, a media access control-control element (MAC-CE) is provided for a WUS activation/deactivation. In other aspects, a physical layer (L1) field is added (e.g., a single new bit (or group of bits) in the physical downlink control channel (PDCCH) for supporting for a WUS activation/deactivation.

The diagram 650 of FIG. 6B is similar to the diagram 600 in FIG. 6A, except the absent WUS signal 622 shown in FIG. 6A is received in FIG. 6B as a WUS signal 625. Receiving the WUS signal 625 triggers an ON duration 652. In this example, the WUS monitoring deactivates after the ON duration 652. When the WUS monitoring deactivates, the UE does not monitor for the WUS. As a result of the UE not monitoring for the WUS, the UE does not receive a WUS, as shown by an absent WUS 670. In this example, the WUS monitoring is subsequently activated and the UE detects the next WUS 680. The MAC or physical layer activating and deactivating of the WUS may be dependent on the type of traffic the base station is transmitting to the UE. When activating a WUS, a previous WUS configuration is cleared from the UE buffer.

According to aspects of the present disclosure, a signature (e.g., a bit sequence) is assigned for activation and/or deactivation of the wake up signal (WUS). For example, a user equipment (UE) recognizes the signature in an existing field (e.g., an existing control channel field) to activate or deactivate the WUS. For example, a first signature may be assigned for activation, and a second signature may be assigned for deactivation. Similarly, scrambling codes may be used where a first scrambling code may be assigned to deactivation, a second code may be assigned to activation, and a third code may be assigned for regular use. Data bits may be used (e.g., in a physical downlink shared channel (PDSCH)), in which case an indicator is provided in the physical downlink control channel (PDCCH). In these examples, base stations may also respond to wake up signaling using relay stations.

Figure 7:
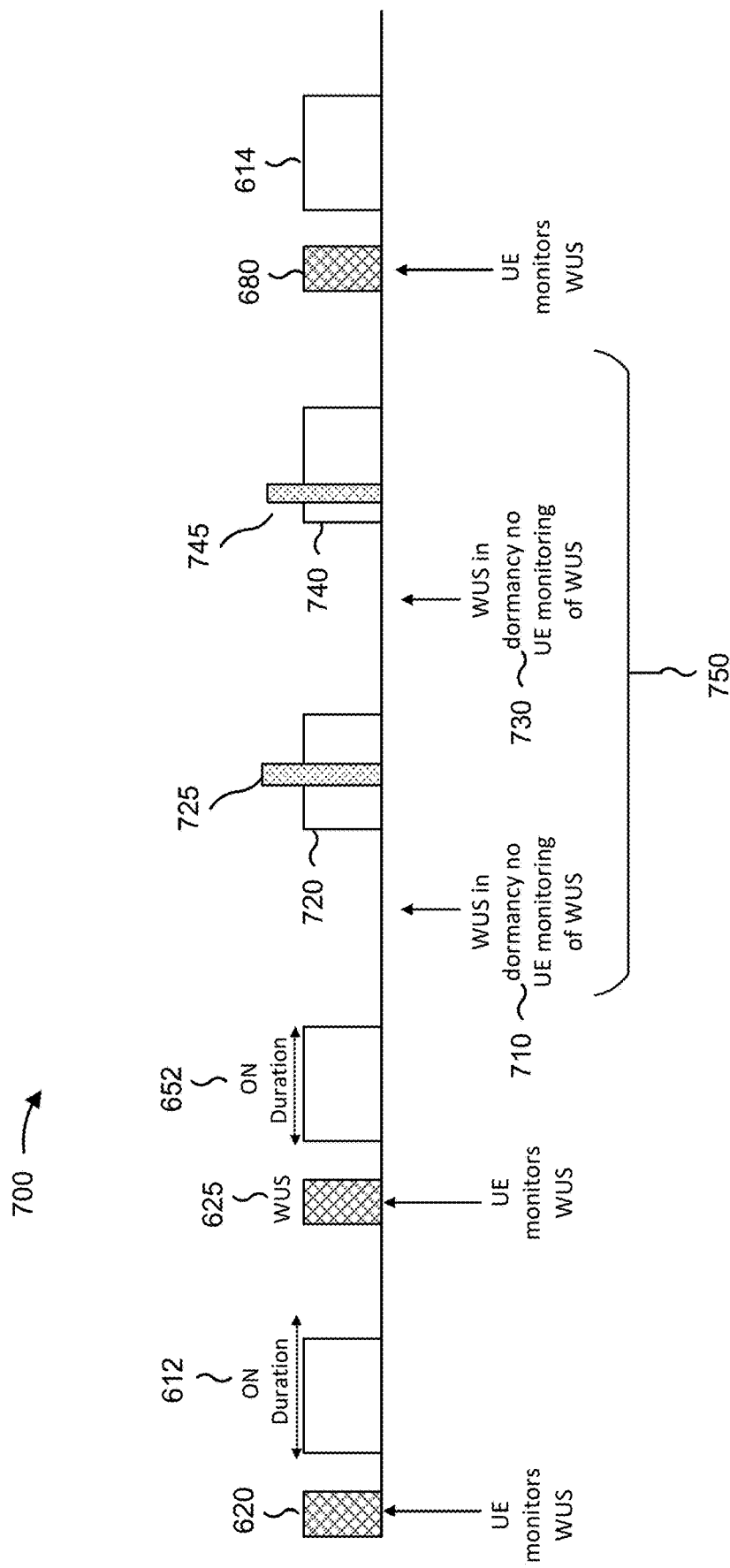
FIG. 7 is a diagram illustrating an example of a user equipment (UE)-side wake up signal (WUS) dormancy configuration for power savings, in accordance with various aspects of the present disclosure.

FIG. 7 is a diagram illustrating an example of a user equipment (UE)-side wake up signal (WUS) dormancy configuration for power savings, in accordance with various aspects of the present disclosure. In FIG. 7, a diagram 700 illustrates an example of a UE-side WUS dormancy configuration for power savings, in accordance with various aspects of the present disclosure. The diagram 700 of FIG. 7 is similar to the diagram 650 in FIG. 6B, in which the WUS signal 625 triggers the ON duration 652. In this example, WUS dormancy is activated after the ON duration 652. The UE does not monitor for the WUS during a WUS dormancy period 750, in which a WUS will not be received because, for example, an application expects to receive data for a period of time (e.g., periodic data from a VR application for a few C-DRX cycles) and thus, the UE remains awake to receive the data. In other words, no WUS monitoring is needed. The WUS dormancy includes a first WUS dormancy period 710 and a second WUS dormancy period 730 in the example of FIG. 7. While in the WUS dormancy period 750, the UE maintains the WUS configuration in its buffer. Thus, UE implementation of WUS dormancy is faster than implementation of WUS activation and deactivation.

During the WUS dormancy period 750, the base station transmits data 725, 745 during a first ON duration 720 and a second ON duration 740. For example, an application may trigger periodic data transmission. The WUS dormancy period 750 coincides with when the UE expects to receive the data 725, 745 during the ON durations 720, 740 because the UE need not monitor for a WUS when the UE is expecting to receive data. For example, an application may be running that will receive the periodic data 725, 745, which allows the UE to enter WUS dormancy. In this example, WUS monitoring is subsequently activated after the WUS dormancy period 750 ends (which may occur after a timer expires, or based on the application, for example) and the UE detects the WUS 680.

According to aspects of the present disclosure, a wake up signal (WUS) dormancy period 750 may last for a duration of time (e.g., a WUS dormancy period 750). During the WUS dormancy period 750, a WUS configuration remains the same, but monitoring of the WUS is skipped. During the WUS dormancy period 750, the user equipment (UE) skips monitoring of the WUS for the duration of time, which may be dictated by: (a) a timer (e.g., a number of discontinuous reception (DRX) cycles or a period of time); or (b) a received message from the network to start monitoring the WUS again. In the example of FIG. 7, the WUS dormancy period 750 is shown to include the first WUS dormancy period 710 and the second WUS dormancy period 730 during which transmitted data 725, 745 is received during the first ON duration 720 and the second ON duration 740.

A latency for transitioning a user equipment (UE) from wake up signal (WUS) dormancy to non-dormancy or vice versa is lower than the noted WUS monitoring activation/deactivation latency, from an implementation perspective, because the configuration is maintained during dormancy. During a dormancy/non-dormancy transition, a UE may request WUS suspension for a duration of time (e.g., M connected-mode discontinuous reception (CDRX) cycles), as shown by the WUS dormancy period 750, where M=2. Dormancy/non-dormancy transitioning may be desirable for a mobile originated application when the UE knows how long the application will run. In this case, the UE sets the WUS dormancy period 750 for the length of the application run time.

The base station may also decide to put the UE into a WUS dormancy mode or bring the UE out of a WUS dormancy mode, for example, in the case of network initiated traffic. According to these aspects of the present disclosure, WUS dormancy activation and deactivation may be indicated using physical layer (L1) or media access control (MAC) (L2) signaling. Alternatively, a pre-agreed rule may exist, where the network and UE agree if a certain application starts on the UE, WUS dormancy occurs for a period of time. In these aspects, WUS dormancy beneficially reduces a radio resource control (RRC) signaling overhead associated with the WUS compared to complete WUS activation/deactivation.

Figure 8:
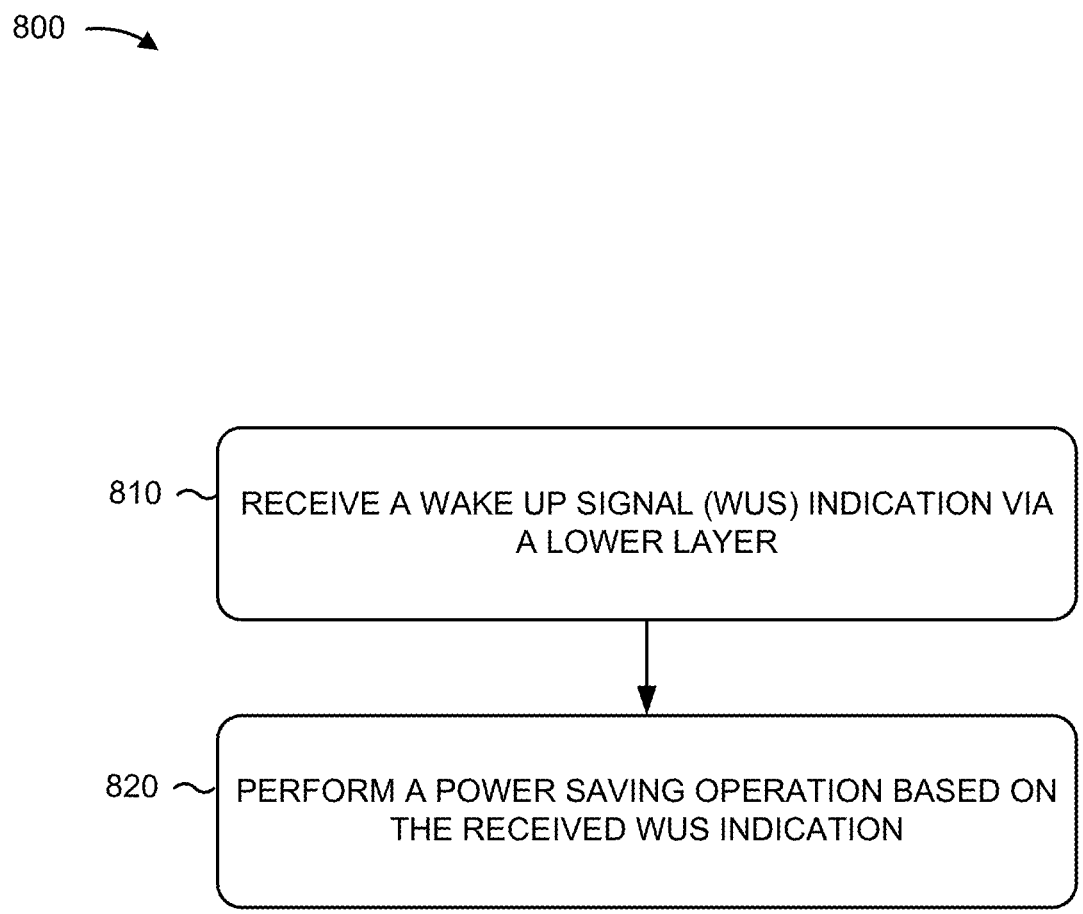
FIG. 8 is a flow diagram illustrating an example process performed, for example, by a user equipment or a base station, in accordance with various aspects of the present disclosure.

FIG. 8 is a diagram illustrating an example a process 800 for wake up signal (WUS) activation/deactivation performed, for example, by a user equipment (UE), in accordance with various aspects of the present disclosure. The process 800 for WUS activation/deactivation is an example.

As shown in FIG. 8, in some aspects, the process 800 may include receiving a wake up signal (WUS) indication via a lower layer (block 810). For example, the lower layer can be a physical (PHY) layer or a media access control (MAC) layer, which are lower layers relative to a radio resource control (RRC) layer. The lower layer message may include a field composed of one or more bits configured to provide the wake up signal indication. The user equipment (UE) (e.g., using the antenna 252, demodulator (DEMOD) 254, multiple-input and multiple-output (MIMO) detector 256, receive processor 258, controller/processor 280, and/or the like) or the base station (e.g., using the antenna 234, DEMOD 232, MIMO detector 236, receive processor 238, controller/processor 240, and/or the like) may receive the wake up signal indication.

As shown in FIG. 8, in some aspects, the process 800 may include performing a power saving operation based on the received wake up signal indication (block 820). For example, the UE (e.g., using the controller/processor 280, and/or the like) or the base station (e.g., using the controller/processor 240, and/or the like) can perform the power saving operation. The power saving operation may include suspending WUS monitoring in response to receiving an instruction to suspend. The instruction may be within an extended control channel field. The process 800 may include maintaining a previously received wake up signal configuration during the suspending. The process 800 may further include requesting suspension for a specified period of time.

Figure 9:
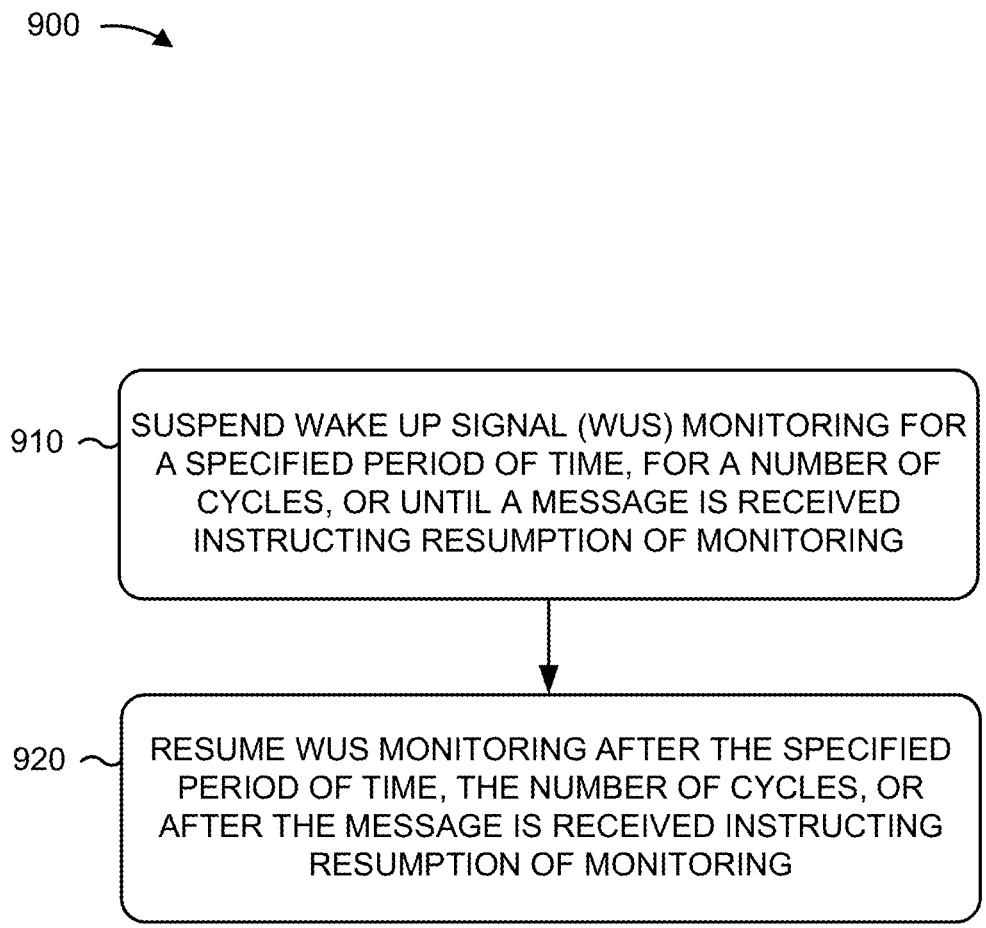
FIG. 9 is a flow diagram illustrating an example process performed, for example, by a user equipment or a base station, in accordance with various aspects of the present disclosure.

FIG. 9 is a diagram illustrating an example process 900 performed, for example, by a base station, in accordance with various aspects of the present disclosure.

As shown in FIG. 9, in some aspects, the process 900 may include suspending wake up signal (WUS) monitoring for a specified period of time, for a number of cycles, or until a message is received instructing resumption of monitoring (block 910). As shown in FIG. 9, in some aspects, the process 900 may include resuming wake up signal (WUS) monitoring after the specified period of time, the number of cycles, or after the message is received instructing resumption of monitoring (block 920). For example, the user equipment (UE) (e.g., using the controller/processor 280) and the base station (e.g., using the controller/processor 240, and/or the like) can suspend and resume WUS monitoring.

Figure 10:
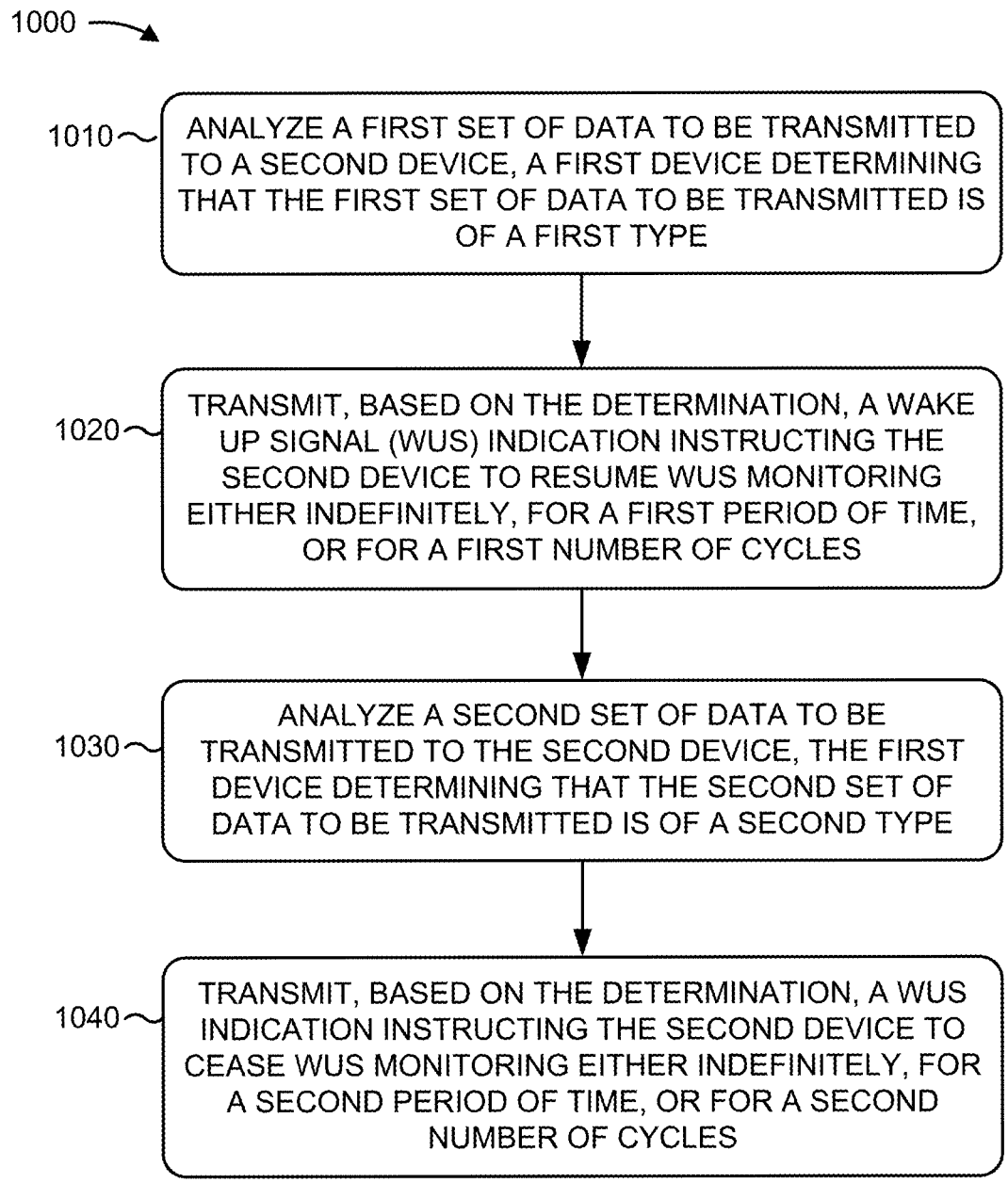
FIG. 10 is a flow diagram illustrating an example process performed, for example, by a user equipment or a base station, in accordance with various aspects of the present disclosure.

FIG. 10 is a diagram illustrating an example process 1000 performed, for example, by a first device, in accordance with various aspects of the present disclosure. The first device can be a user equipment (UE) or a base station.

If data is bursty (e.g., file transfer protocol (FTP) data), then a wake up signal (WUS) works well. If the data is periodic (e.g., extended reality (XR) data), it may be efficient to not use the WUS. As shown in FIG. 10, in some aspects, process 1000 may include analyzing a first set of data to be transmitted to a second device, the first device determining that the first set of data to be transmitted is of a first type (block 1010). As shown in FIG. 10, in some aspects, the process 1000 may include transmitting, based on the determination, a WUS indication instructing the second device to resume WUS monitoring either indefinitely, for a first period of time, or for a first number of cycles (block 1020). In some aspects, the process 1000 may include analyzing a second set of data to be transmitted to the second device, the first device determining that the second set of data to be transmitted is of a second type (block 1030). In some aspects, the process 1000 may include transmitting based on the determination, a WUS indication instructing the second device to cease WUS monitoring either indefinitely, for a second period of time, or for a second number of cycles (block 1040). For example, the user equipment (UE) (e.g., using the antenna 252, modulator (MOD) 254, transmit multiple-input and multiple-output (TX MIMO) detector 256, transmit processor 264, controller/processor 280, and/or the like) or the base station (e.g., using the using the antenna 234, MOD 232, TX MIMO processor 230, transmit processor 220, controller/processor 240, and scheduler 246 and/or the like) can analyze data and transmit the WUS.

Although FIGS. 8-10 show example blocks of processes 800, 900, and 1000, in some aspects, the processes 800, 900, and 1000 may include additional blocks, fewer blocks, different blocks, or differently arranged blocks than those depicted in FIGS. 8-10. Additionally, or alternatively, two or more of the blocks of processes 800, 900, and 1000 may be performed in parallel. It is noted that either a base station or a user equipment (UE) can perform the process 800, 900, and 1000.

Implementation examples are described in the following numbered clauses:

1. A method of wireless communication performed by a first device, comprising:

suspending wake up signal (WUS) monitoring for a specified period of time, for a number of cycles, or until a message is received instructing resumption of monitoring; and resuming wake up signal monitoring after the specified period of time, the number of cycles, or after the message is received instructing resumption of monitoring.

2. The method of clause 1, further comprising maintaining a previously received wake up signal configuration during the suspending.

3. The method of any of clauses 1-2, further comprising requesting suspending for the specified period of time.

4. The method of any of clauses 1-2, in which the suspending occurs based upon a pre-agreed rule between a user equipment (UE) and a base station.

5. The method of any of clauses 1-2, in which the suspending occurs in response to receiving an instruction to suspend.

6. The method of any of clauses 1-5, in which the instruction is within an extended control channel field.

7. The method of any of clauses 1-5, in which the instruction is detected based on a scrambling code.

8. The method of any of clauses 1-5, in which the instruction is detected from a known signature within an existing control channel field.

9. The method of any of clauses 1-5, in which the instruction is detected from a wake up signal (WUS) media access control-control element (MAC-CE).

10. The method of any of clauses 1-9, in which suspending comprises not monitoring a wake up signal (WUS) occasion for the WUS.

11. The method of any of clauses 1-10, in which the first device comprises a user equipment (UE).

12. The method of any of clauses 1-10, in which the first device comprises a base station.

13. A method of wireless communication performed by a first device, comprising:

receiving a wake up signal (WUS) indication via lower layer signaling; and performing a power saving operation based on the received WUS indication.

14. The method of clause 13, in which the first device comprises a user equipment (UE).

15. The method of clause 13, in which the first device comprises a base station.

16. The method of any of clauses 13-15, in which the wake up signal indication comprises an activation signal or a deactivation signal from physical layer (L1) signaling.

17. The method of any of clauses 13-15, in which the wake up signal indication is within an extended control channel field.

18. The method of any of clauses 13-15, in which the wake up signal indication is detected based on a scrambling code.

19. The method of any of clauses 13-15, in which the wake up signal indication is detected from a known signature within an existing control channel field.

20. The method of any of clauses 13-15, in which the wake up signal indication comprises an activation signal or a deactivation signal from media access control (MAC) layer signaling.

21. An apparatus, comprising:

a processor;

a memory coupled with the processor; and instructions stored in the memory and operable, when executed by the processor, to cause the apparatus:

to suspend wake up signal (WUS) monitoring for a specified period of time, for a number of cycles, or until a message is received instructing resumption of monitoring; and to resume wake up signal monitoring after the specified period of time, the number of cycles, or after the message is received instructing resumption of monitoring.

22. The apparatus of clause 21, further comprising means for maintaining a previously received wake up signal configuration during the suspending.

23. The apparatus of any of clauses 21-22, further comprising means for requesting suspending for the specified period of time.

24. The apparatus of any of clauses 21-22, in which the suspending occurs based upon a pre-agreed rule between a user equipment (UE) and a base station.

25. The apparatus of any of clauses 21-22, in which the suspending occurs in response to receiving an instruction to suspend.

26. An apparatus, comprising:

a processor;

a memory coupled with the processor; and instructions stored in the memory and operable, when executed by the processor, to cause the apparatus:

to receive a wake up signal (WUS) indication via lower layer signaling; and to perform a power saving operation based on the received WUS indication.

27. The apparatus of clause 26, in which the apparatus comprises a user equipment (UE).

28. The apparatus of clause 26, in which the apparatus comprises a base station.

29. The apparatus of any of clauses 26-28, in which the wake up signal indication comprises an activation signal or a deactivation signal from physical layer (L1) signaling.

30. The apparatus of any of clauses 26-28, in which the wake up signal indication is within an extended control channel field.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a first device, comprising:
   operating in a connected-mode discontinuous reception (C-DRX) mode;
   monitoring for a wake up signal (WUS) every C-DRX cycle;
   receiving an instruction to temporarily suspend monitoring for the WUS, the instruction detected at least one of: within an extended control channel field, based on a scrambling code, from a known signature within an existing control channel field, within a WUS media access control-control element (MAC-CE), or within a WUS physical layer signal;
   suspending wake up signal monitoring in response to the instruction, before or at a beginning of a first DRX ON duration, for a specified period of time, for a number of cycles, or until a message is received instructing resumption of monitoring;
   receiving data during suspension of wake up signal monitoring; and
   resuming wake up signal monitoring, before or at a beginning of a subsequent DRX ON duration, after the specified period of time, the number of cycles, or after the message is received instructing resumption of monitoring.

2. The method of claim 1, further comprising maintaining a previously received wake up signal configuration during the suspending.

3. The method of claim 1, further comprising requesting suspending for the specified period of time.

4. The method of claim 1, in which the suspending occurs based upon a pre-agreed rule between a user equipment (UE) and a base station.

5. The method of claim 1, in which suspending comprises not monitoring a wake up signal (WUS) occasion for the WUS.

6. The method of claim 1, in which the first device comprises a user equipment (UE).

7. The method of claim 1, in which the first device comprises a base station.

8. An apparatus, comprising:
   a processor;
   a memory coupled with the processor; and
   instructions stored in the memory and operable, when executed by the processor, to cause the apparatus:
      to operate in a connected-mode discontinuous reception (C-DRX) mode;
      to monitor for a wake up signal (WUS) every C-DRX cycle;
      to receive an instruction to temporarily suspend monitoring for the WUS, the instructions detected at least one of: within an extended control channel field, based on a scrambling code, from a known signature within an existing control channel field, within a WUS media access control-control element (MAC-CE), or within a WUS physical layer signal;
      to suspend wake up signal monitoring in response to the instructions, before or at a beginning of a first DRX ON duration, for a specified period of time, for a number of cycles, or until a message is received instructing resumption of monitoring;
      to receive data during suspension of wake up signal monitoring; and
      to resume wake up signal monitoring, before or at a beginning of a subsequent DRX ON duration, after the specified period of time, the number of cycles, or after the message is received instructing resumption of monitoring.

9. The apparatus of claim 8, in which the instructions further cause the apparatus to maintain a previously received wake up signal configuration during the suspending.

10. The apparatus of claim 8, in which the instructions further cause the apparatus to requesting suspending for the specified period of time.

11. The apparatus of claim 8, in which the suspending occurs based upon a pre-agreed rule between a user equipment (UE) and a base station.

* * * * *